N. A. BOYNTON.

Assignor to himself, H. A. & H. T. Richardson.

COOKING STOVE.

No. 7,637. Reissued April 24, 1877.

WITNESSES

Chas J Cook

E. Blond Burdett

INVENTOR

Nathaniel A. Boynton

By Knight Bros Attorneys

N. PETERS, PHOTO-LITHOGRAPHER, WASHINGTON, D. C.

UNITED STATES PATENT OFFICE.

NATHANIEL A. BOYNTON, OF NEW YORK, N. Y., ASSIGNOR TO HIMSELF, HENRY A. RICHARDSON, AND HENRY T. RICHARDSON.

IMPROVEMENT IN COOKING-STOVES.

Specification forming part of Letters Patent No. 86,499, dated February 2, 1869; reissue No. 5,203, dated December 24, 1872; reissue No. 7,637, dated April 24, 1877; application filed February 26, 1877.

*To all whom it may concern:*

Be it known that I, NATHANIEL A. BOYNTON, of the city, county, and State of New York, have invented an Improvement in Cooking-Stoves, of which the following is a specification:

The invention relates, first, to an ash-pit extending under the oven, in combination with a supplemental oven or warming-chamber, separated from the said ash-pit by a suitable partition; second, to a perforated division-plate, separating the ash-pit and supplemental oven; third, to the construction of a cooking-stove or range with an ash-pit in the base or lower part, surmounted by a deflecting plate or plates, which cause ashes dropping through the grate to fall into an ash-pan placed within the ash-pit; fourth, to a gravitating door of peculiar construction, for closing a poke-hole or draft-aperture.

Figure 1:
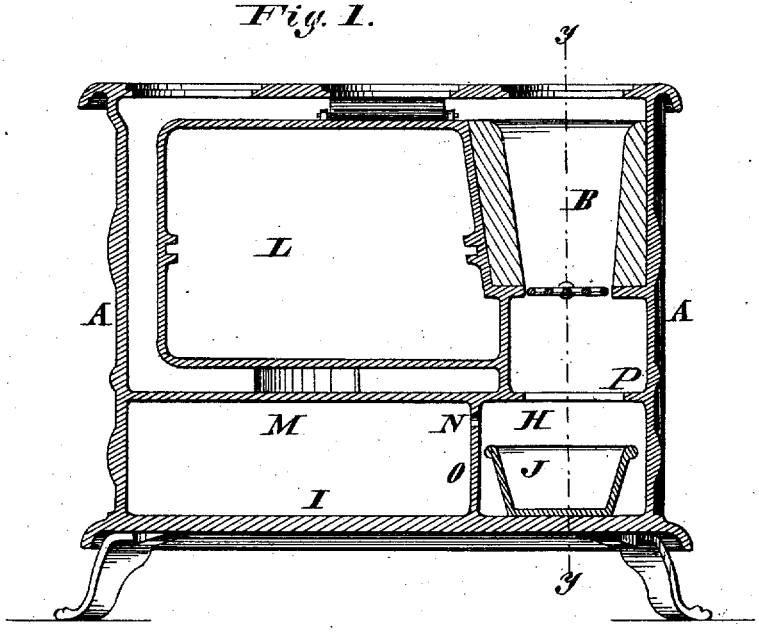
Figure 3:
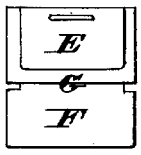
Figure 2:
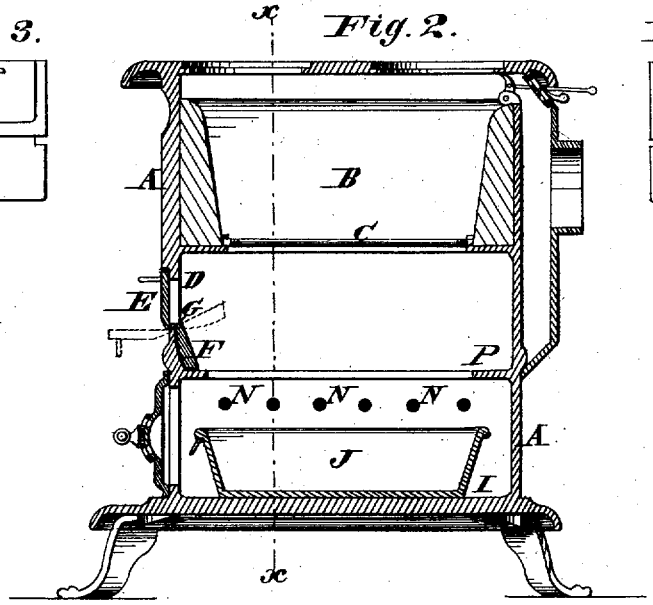
Figure 4:
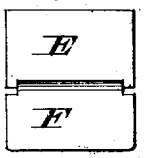

In the accompanying drawing, Figure 1 represents a vertical section of my improved stove in the plane *x x* in Fig. 2. Fig. 2 represents a vertical section in the plane *y y* in Fig. 1. Fig. 3 is a view of the exterior of the door E and of the tail-piece. Fig. 4 is an inside view of the door with the tail-piece.

This invention relates to cooking-stoves; and consists in several features of improvement, as hereinafter described, and as shown in the drawing.

The letter A designates the stove, which may be made of any desired proportions or shape, provided the principle of my improved construction and arrangement is adhered to. The top of the stove is provided with boiler-holes, which can be conveniently arranged without crowding, because the exit-flue is made to leave the stove at its side instead of at its top. The letter B designates the fire-chamber, whose grate C is revolved in the usual manner by a wrench applied to the end of one of its journals. Below the level of the grate C is an opening or poke-hole, D, in the wall of the fire-chamber, the object of which is to allow a poker to be inserted below the grate, to clear it of ashes and cinders by that means. The opening D is closed by a balancing-door, E, which is seen in edge view in Fig. 2, and in front view or elevation in Fig. 3, and which is so constructed and arranged as to remain either open or closed by gravity without requiring any fastening, said door being made with a tail-piece, F, which is received within the stove, where it swings or vibrates up and down when the door is opened and closed. The tail-piece F is connected to the door by a horizontal plate, G, which is concave on its under surface, and forms a shoulder, that rests on the bottom edge of the opening D, and allows the door to turn on such edge, the said plate G being made of such length as to fit easily between the sides of the opening; but that part of the door which remains on the outside of the stove is wider and longer than the opening D, and its edges consequently overlap the sides and top of the opening. The tail-piece is also made wider than the opening. This greater width of both the door and tail-piece, as compared with the width of the opening D, prevents the door from falling out of its place. In order to remove the door from the stove and put it in place again, it is only necessary to turn it up sidewise, so as to bring one of its edges opposite one of the upper angles of the opening or doorway, when it can be easily pushed in or taken out.

The door and tail-piece are arranged in different planes, in such a manner that when the door is closed the center of gravity of the parts will fall inside of a vertical plane passing through the line of support of the door, where the hollow or concave shoulder G rests on the bottom edge of the opening or doorway D, thereby keeping the door up close against the stove. When, on the other hand, the door is opened and turned down to its lowest position the center of gravity is brought outside of the line of support, and the superior weight of the door keeps it down, the edges of the tail-piece abutting against the inside edges of the doorway D, and preventing the door falling away from the stove. Below the grate C is the ash-pit H, which occupies the whole space between the grate C and the bottom plate I of the stove, but has, at any convenient height, a plate or plates, P, leaving a central opening, through which ashes dropping from the fire-chamber will be concentrated, so as to cause them to fall within a movable tray or ash-pan, J, which is placed in the ash-pit to receive them. The ash-pit H readily receives an ash-pan, J, of sufficient size to receive the whole contents of the fire box or chamber B. The tray or ash-pan J is removed and replaced through the doorway K. The oven L is directly behind the fire-chamber, and is so arranged that its bottom plate is below the level of the grate C, whereby some of the heat which radiates from the fire past the bars of the grate is allowed to act directly upon the front side of said oven. Below the oven L is a warming-chamber or supplemental oven, M, which occupies the space between the main oven and the bottom of the stove, and between the ash-pit and the back plate of the stove. The division-plate O, which separates the ash-pit from the chamber or oven M, may be provided with holes N, through which any cool air which gains access to the chamber M will pass out to the fire by the natural draft of the stove. The chamber or supplementary oven M is provided with a door on the same side as the usual door to the main oven L, and the usual flues pass under the oven L and behind it, and connect with the exit-pipe on the side of the stove.

It will be observed that, by means of my invention, I obtain, in addition to the main oven, in which the highest heat for baking is obtained, a warming-chamber or supplementary oven within the walls of the stove, in which chamber I can place articles that are removed from the main oven, and which require only a moderate degree of heat to perfect them, while the main oven is continued in use for baking with full heat, thus doing away with any necessity for opening the main oven in order to perfect its contents under a less degree of heat. The chamber M can also be used to bring articles to a moderate degree of heat, and also to warm the apartment, when the door of the chamber is left open.

It will also be observed that, by means of the construction and arrangement here shown, a considerable part of the large amount of heat which is found in the ash-pit is saved or utilized by being communicated to the chamber M through the division-plate O. The chamber M can also be used for the ordinary purposes of a hot-closet, and it can also be used as a receptacle for coal or other fuel, any gases which may be generated therefrom by the gentle heat being allowed to escape through the holes N into the ash-pit and fire-chamber, where they will be burned. It may also be used for drying kindling or other wood and other articles, and for any other purposes to which a hot-closet may be put.

Several advantages result from extending the ash-pit under the oven. Of these I mention three: first, it affords a large roomy ash-pit, and permits the use of an extra-large ash-pan under the grate without boxing out the end of the stove; second, it affords space for all necessary appliances for providing a free draft through the ash-pit without obstruction from the accumulation of ashes; third, a large roomy ash-pit enables the air to be partially heated before passing through the burning fuel, producing a more quick and thorough combustion.

Having thus described my invention, the following is what I claim as new and desire to secure by Letters Patent:

1. The extension of the ash-pit under the oven, in combination with the warming-chamber or supplementary oven at the back or side of the ash-pit, separated therefrom by a perforated or other partition, substantially as and for the purpose specified.

2. The perforated division-plate O, which separates the ash-pit H from the supplementary oven M, substantially as described.

3. A cooking-stove constructed with a baking-oven, a warm-closet, M, beneath it, a deep ash-pit, H, separated from the warm-closet by a partition, O, and a deflecting-plate, (or plates,) P, placed above the ash-pit and below the grate, substantially as and for the purposes set forth.

4. The balance-door E, provided with a shoulder, G, which forms its point or line of support, and a tail-piece, F, which aids in operating the door, substantially as described and shown.

NATHANIEL A. BOYNTON.

Witnesses:
OCTAVIUS KNIGHT,
LE BLOND BURDETT.